US009224229B2

(12) United States Patent
Panter et al.

(10) Patent No.: US 9,224,229 B2
(45) Date of Patent: Dec. 29, 2015

(54) PROCESS AND APPARATUS FOR DATA REGISTRATION

(75) Inventors: Benjamin David Panter, Edinburgh (GB); Robert John Tweedie, Edinburgh (GB); Paul Henderson, Edinburgh (GB)

(73) Assignee: BLACKFORD ANALYSIS LIMITED, Edinburgh, Lothian (GB)

(*) Notice: Subject to any disclaimer, the term of this patent is extended or adjusted under 35 U.S.C. 154(b) by 240 days.

(21) Appl. No.: 13/989,058

(22) PCT Filed: Nov. 23, 2011

(86) PCT No.: PCT/GB2011/052305
§ 371 (c)(1),
(2), (4) Date: Aug. 5, 2013

(87) PCT Pub. No.: WO2012/069833
PCT Pub. Date: May 31, 2012

(65) Prior Publication Data
US 2013/0308876 A1    Nov. 21, 2013

Related U.S. Application Data

(60) Provisional application No. 61/416,837, filed on Nov. 24, 2010, provisional application No. 61/503,147, filed on Jun. 30, 2011.

(51) Int. Cl.
*G06K 9/00* (2006.01)
*G06T 11/60* (2006.01)
*G06T 7/00* (2006.01)

(52) U.S. Cl.
CPC .............. *G06T 11/60* (2013.01); *G06T 7/0024* (2013.01); *G06T 2207/10072* (2013.01); *G06T 2207/30004* (2013.01)

(58) Field of Classification Search
None
See application file for complete search history.

(56) References Cited

U.S. PATENT DOCUMENTS 6,009,212 A  * 12/1999  Miller et al. .................. 382/294
6,754,374 B1 *  6/2004  Miller et al. .................. 382/128
(Continued)

FOREIGN PATENT DOCUMENTS

WO    WO 2007070008 A1 *  6/2007
WO          2009/040514        4/2009
(Continued)

OTHER PUBLICATIONS

Artaechevarria et al., "Efficient Classifier Generation and Weighted Voting for Atlas-Based Segmentation: Two Small Steps Faster and Closer to the Combination Oracle", SPIE, PO Box 10 Bellingham WA 98227-0010 USA, vol. 6914, 2008, pp. 1-9.

*Primary Examiner* — Wenpeng Chen
(74) *Attorney, Agent, or Firm* — Liu & Liu

(57) ABSTRACT

A process of bringing first and second data sets into registration/conformity with each other. A plurality of candidate data sets are provided, each being a differently shifted or distorted form of a reference data set. Each of the first and second data sets and the reference data set being a representation of a particular physical object. The process compares respectively the first and second data sets with each of the candidate data sets and in dependence on the comparisons to determine respective first and second transformations that bring into registration or conformity with each other the reference data set and a particular candidate data set out of the plurality of candidate data sets which provides a best match with the respective first and second data sets, and brings the first and second data sets into registration/conformity with each other in dependence on the first and second transformations.

20 Claims, 7 Drawing Sheets

(56) References Cited

U.S. PATENT DOCUMENTS

| | | | |
|---|---|---|---|
| 6,795,567 B1* | 9/2004 | Cham et al. | 382/103 |
| 7,286,694 B2* | 10/2007 | Oosawa | 382/128 |
| 8,363,955 B2* | 1/2013 | Pupilli et al. | 382/199 |
| 2001/0048757 A1* | 12/2001 | Oosawa | 382/130 |
| 2004/0019253 A1* | 1/2004 | Tsujita et al. | 600/118 |
| 2005/0111718 A1* | 5/2005 | MacMahon et al. | 382/130 |
| 2005/0152618 A1* | 7/2005 | Takahashi | 382/294 |
| 2006/0120583 A1* | 6/2006 | Dewaele | 382/128 |
| 2007/0127795 A1* | 6/2007 | Lau et al. | 382/128 |
| 2008/0247621 A1* | 10/2008 | Zarkh et al. | 382/130 |
| 2008/0273779 A1* | 11/2008 | Pekar | 382/131 |
| 2008/0298657 A1* | 12/2008 | Shiraishi et al. | 382/130 |
| 2009/0028403 A1* | 1/2009 | Bar-Aviv et al. | 382/128 |
| 2009/0274350 A1* | 11/2009 | Pavlovskaia et al. | 382/128 |
| 2010/0067762 A1* | 3/2010 | Glocker et al. | 382/131 |
| 2010/0290693 A1* | 11/2010 | Cohen et al. | 382/134 |
| 2011/0299795 A1* | 12/2011 | Shibata | 382/294 |
| 2012/0082354 A1* | 4/2012 | Peters et al. | 382/128 |
| 2012/0114208 A1* | 5/2012 | Hirasawa et al. | 382/131 |
| 2012/0177284 A1* | 7/2012 | Wang | 382/154 |
| 2012/0207359 A1* | 8/2012 | Konukoglu et al. | 382/128 |

FOREIGN PATENT DOCUMENTS

| | | |
|---|---|---|
| WO | WO 2009040514 A1 * | 4/2009 |
| WO | WO 2010150156 A1 * | 12/2010 |

* cited by examiner

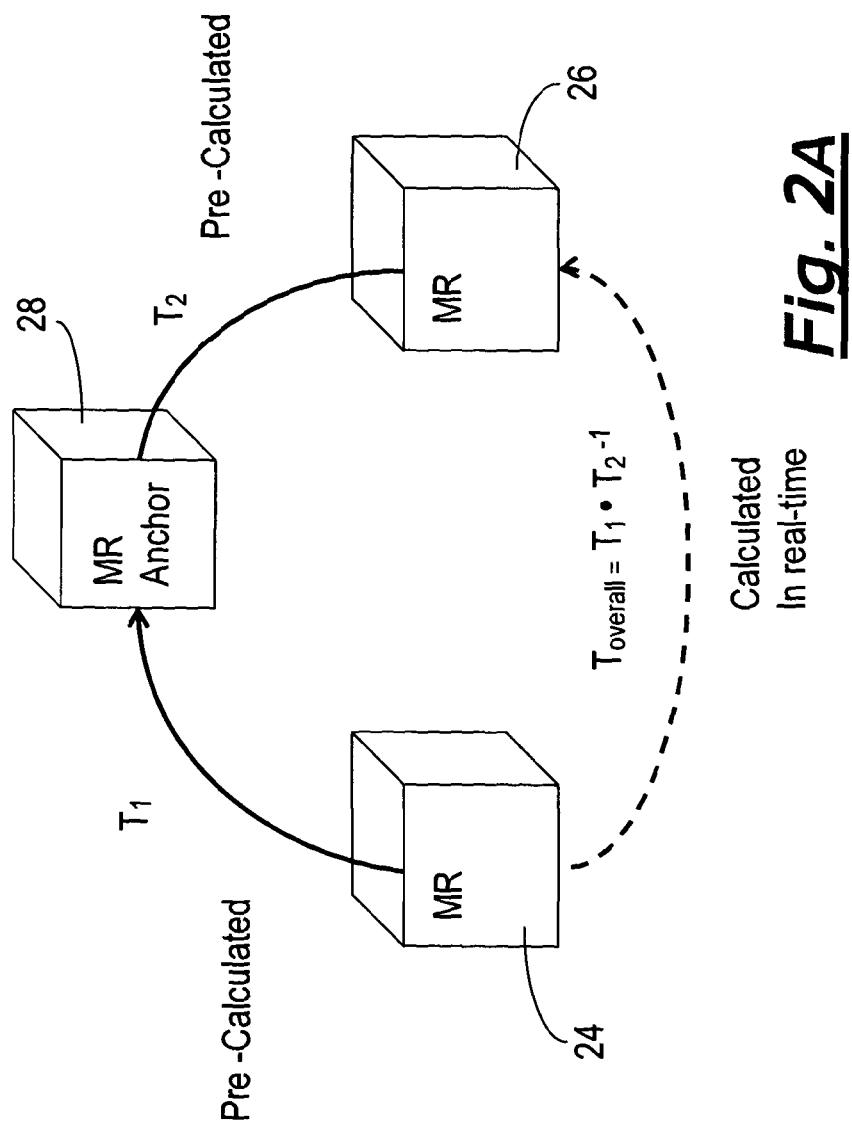

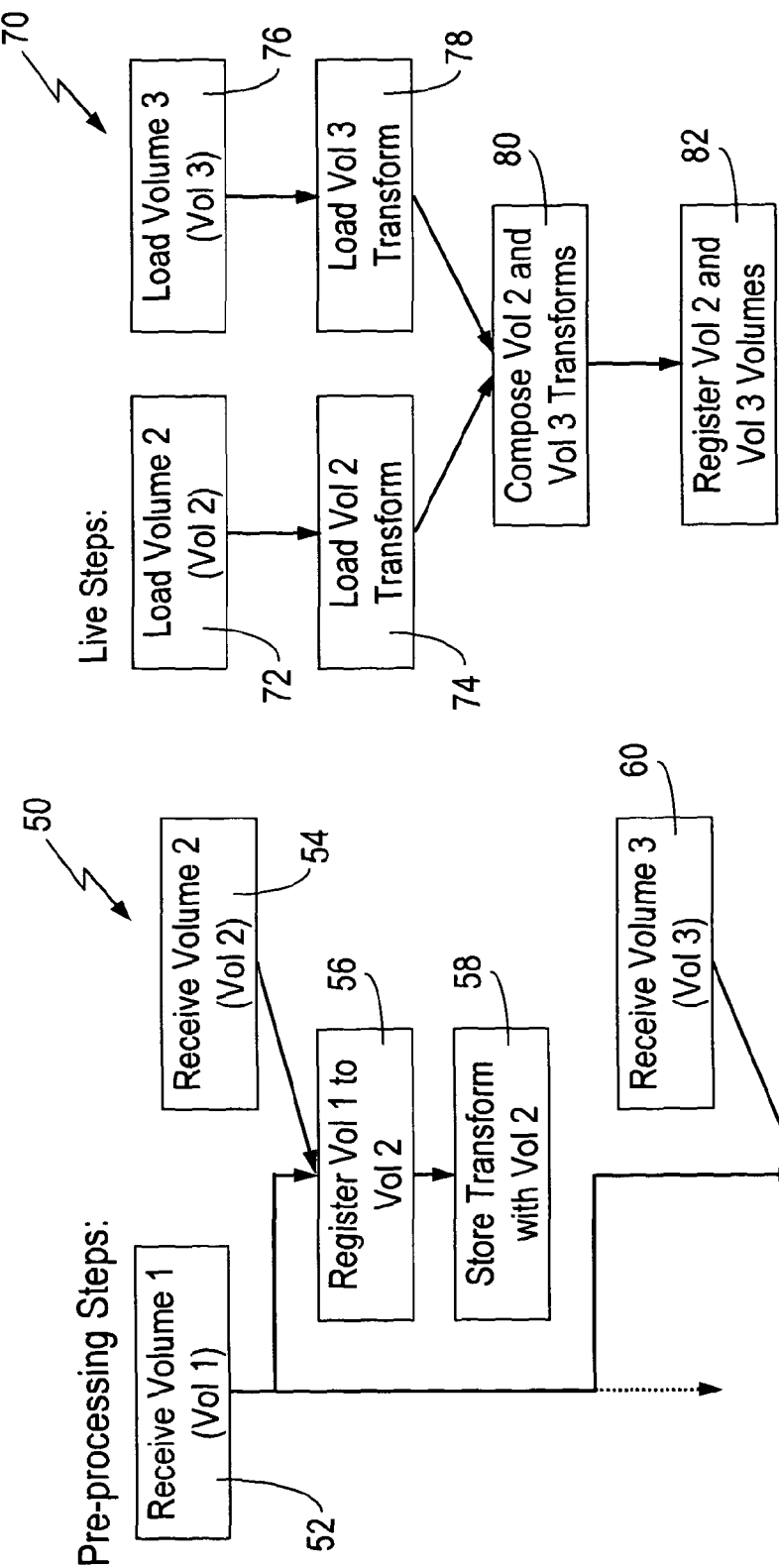

PROCESS AND APPARATUS FOR DATA REGISTRATION

FIELD OF THE INVENTION

The present invention relates to a process of bringing a first data set and a second data set into registration or conformity with each other by electronic methods, a computer program comprising program instructions for causing a computer to perform the same process, and electrical apparatus operative to bring a first data set and a second data set into registration or conformity with each other.

BACKGROUND ART

A Magnetic Resonance Imaging (MRI) scanner may be used to acquire images of a part, such as the head, of a human or animal subject at each of two or more different times. For example images may be acquired at each of a series of consultations during medical treatment of the human or animal subject with the images providing for diagnostic feedback as the treatment progresses. Depending on circumstances it may be advantageous to superimpose images acquired at such different times to gain improved diagnostic feedback with regards to what might be subtle changes in pathology. It is known for radiologists and like experienced personnel to superimpose images manually. Superimposition might be achieved by the radiologist visually identifying one or more particular physical objects, such as an organ or bone, which is common to the different images, and bringing the identified physical objects in the different images into registration with each other. More recently computer implemented approaches to image registration have been devised. For example WO 2009/040514 describes an approach for bringing two or more images into registration or conformity with each other by way of a data compression technique which provides for fast and accurate processing but without there being an undue computational burden.

The present inventor has become appreciative of shortcomings in known approaches to bringing images into registration or conformity with each other. The present invention has therefore been devised in the light of this appreciation.

It is therefore an object for the present invention to provide a process of bringing a first data set and a second data set into registration or conformity with each other by electronic methods, each of the first and second data sets being a representation, e.g. an image, of a particular physical object, such as a part of a human or animal body.

It is a further object for the present invention to provide electrical apparatus operative to bring a first data set and a second data set into registration or conformity with each other, each of the first and second data sets being a representation, e.g. an image, of a particular physical object, such as a part of a human or animal body.

STATEMENT OF INVENTION

According to a first aspect of the present invention there is provided a process of bringing first and second data sets into registration or conformity with each other by electronic methods, each of the first and second data sets being a representation of a particular physical object, the process comprising:

having a plurality of candidate data sets, each candidate data set being a differently shifted or distorted form of a reference data set, the reference data set being a representation of the physical object;

comparing the first data set with each of the candidate data sets and in dependence on the comparisons determining a first transformation that brings the candidate data set, which of the plurality of candidate data sets provides a best match with the first data set, and the reference data set into registration or conformity with each other;

comparing the second data set with each of the candidate data sets and in dependence on the comparisons determining a second transformation that brings the candidate data set, which of the plurality of candidate data sets provides a best match with the second data set, and the reference data set into registration or conformity with each other; and bringing the first and second data sets into registration or conformity with each other in dependence on the first and second transformations.

In use the process involves determining the first and second transformations and then bringing the first and second data sets, which represent the same particular physical object, into conformity or registration with each other in dependence on the first and second transformations. More specifically the first and second transformations may be applied to one of the first and second data sets to bring the said data set into registration or conformity with the other of the first and second data sets. The first and second data sets may therefore be brought into registration or conformity with each other without direct involvement of the candidate data sets or the reference data set from which the candidate data sets are derived.

According to an approach such as that described in WO 2009/040514 a transformation is applied to a data set, e.g. a first CT image, to generate a plurality of candidate data sets which are differently shifted or distorted forms of the data set, and another data set, e.g. a second CT image, is compared with each of the candidate data sets to determine the closest matching candidate data set. The transformation associated with the closest matching candidate data set is then used to bring the first and second data sets into registration or conformity with each other. The present inventor has appreciated that the step of generating the plurality of candidate data sets may impose a significant computational burden depending on when it is carried out compared with the steps of comparing a data set with each of the candidate data sets and bringing the two data sets into registration or conformity with each other. A large number of candidate data sets, such as more than 500000, may be required to characterise the different ways in which the first data set may be shifted or distorted. Furthermore the comparison of a data set with each of the candidate data sets may impose a significant computational burden depending on when it is carried out compared with bringing the two data sets into registration or conformity with each other in dependence on the transformations.

The process according to the present invention addresses such problems by comparing each of the first and second data sets with each of a plurality of candidate data sets, which have been derived from the same reference data set, to determine first and second transformations which are then both used to bring the first and second data sets into conformity or registration with each other. The reference data set is a representation of the physical object. The reference data set may therefore be a representation of the particular physical object, e.g. a representation, such as of an image, of a particular patient's hand acquired earlier than the first and second data sets. The reference data set may be one of a plurality of data sets representing the particular physical object. In certain circumstances the reference data set may be a representation of a second particular physical object with the first and second data sets being representations of a first particular physical object, the first and second particular physical objects being of a same kind of physical object. For example the first particular physical object may be a first patient's hand and the second particular physical object may be a second patient's hand with the first and second patients' hands being sufficiently similar, such as in terms of their dimensions and density of anatomy, to allow for their corresponding representations to be brought into registration or conformity. Hence the first particular physical object and the second particular physical object may be sufficiently similar to allow for their corresponding representations to be brought into registration or conformity.

The candidate data sets may be formed as part of a non time critical process, e.g. during pre-processing. Depending on the form of application of the invention the comparison step may also be carried out as part of a non time critical process or it may be carried out during time critical processing, e.g. during a consultation when CT images are being acquired. Therefore at least one of formation of candidate data sets and the comparison steps may be carried out at a first stage and the bringing of the data sets into registration or conformity with each other may be carried out at a second stage, the first and second stages being spaced apart in time from each other. More specifically the reference data set may be stored and the derived candidate data sets may be formed and stored for subsequent use. Furthermore when the first data set is obtained, e.g. as a first CT image, the first data set may be compared with the candidate data sets to determine the first transformation, which may then be stored for later use. At a later stage the second data set may be obtained, e.g. as a second CT image, and compared with the candidate data sets to determine the second transform. Hence the second transform may be applied with the stored first transform to effect registration of the two data sets. In a further example of application of the invention more than two transformations may be stored at the same or different times and used subsequently to effect registration of a particular and perhaps yet untried combination of data sets, e.g. a stored second transformation and a stored ninth transformation may be applied to effect registration of a second data set to a ninth data set. Therefore at least one of the first and second transformations may be determined at a first stage and the bringing of the data sets into registration or conformity with each other may be carried out at a second stage, the first and second stages being spaced apart in time from each other. It can be appreciated that the present invention may provide an increasing reduction in computational burden as the number of data sets increases. More specifically where there are N data sets and one of the N data sets is the reference data set, N−1 transformations may be required for registration of each of the data sets with each of all the other data sets. According to known approaches N(N−1)/2 transformations may be required for registration of each of the data sets with each of all the other data sets. For example where there are ten data sets nine transformations may be required for the present invention whereas forty-five transformations may be required for known approaches. In certain circumstances there may be as many as thirty or forty data sets. In addition to reducing the computational burden the present invention may afford a reduction in the number of data sets recovered from storage. This may be a particular advantage where data sets are stored on high latency data storage, e.g. data storage located afar from a central processing unit and communicating with the central processing unit by way of a low bandwidth channel.

Alternatively or in addition at least one of the reference data set and the first and second data sets may be representations of the physical object obtained by different forms of sensing apparatus from at least one other of the reference data set and the first and second data sets. The different forms of sensing apparatus may be different forms of imaging apparatus, e.g. Computed Tomography (CT) apparatus and Magnetic Resonance Imaging (MRI) apparatus. For example the reference data set and the first data set may be representations of the physical object obtained by first imaging apparatus and the second data set may be a representation of the physical object obtained by second imaging apparatus. More specifically the first and second data sets may be representations of the physical object obtained by different forms of sensing apparatus.

The step of comparing a data set with each of the candidate data sets may comprise determining a transformation that has generated the candidate data set. At least one of the first and second transformations may be the transformation or an inverse of the transformation. More specifically the first and second data sets may be brought into registration or conformity with each other in dependence on one of the first and second transformations and an inverse of the other of the first and second transformations. For example if one were to bring the second data set into registration with the first data set each of the first transformation and the inverse of the second transformation would be applied to the second data set. Alternatively if one were to bring the first data set into registration with the second data set each of the inverse of the first transformation and the second transformation would be applied to the first data set.

As mentioned above candidate data sets may be derived from the reference data set during a non time critical process. Alternatively or in addition the process may therefore further comprise generating a plurality of candidate data sets by applying a transformation to the reference data set, the transformation being changed from one application of the transformation to another such that each of a plurality of candidate data sets is a differently shifted or distorted reference data set. When generated the candidate data sets and the transformations may be provided to apparatus where the steps of comparison and bringing into registration or conformity are carried out. The candidate data sets and associated transformations may, for example, be provided in the form of data stored on a record medium, such as on an optical disc, or conveyed from a remote location by an electrical carrier signal, such as via a secure internet connection, for keeping on apparatus where the steps of comparison and bringing into registration or conformity are carried out. The candidate data sets and associated transformations may be kept on the apparatus, e.g. stored in local memory, on a temporary or permanent basis.

The transformation may have predetermined variables that are changed from one application of the transformation to another in a substantially constant manner. Hence each of the plurality of candidate data sets may be a differently shifted or distorted form of the reference data set. Also there may be a substantially constant change between different pairs of candidate data sets in respect of the extent of shift or distortion. For example first to ninth candidate data sets may represent a shift in a particular direction of one tenth to nine tenths respectively in one tenth steps.

The transformation may have predetermined variables that are changed from one application of the transformation to another in a varying manner. Hence each of the plurality of candidate data sets may be a differently shifted or distorted form of the reference data set. Also there may be a varying change between different pairs of candidate data sets in respect of the extent of shift or distortion. For example a first candidate data set may represent a shift of one tenth in a particular direction, a second candidate data set may represent a shift of three tenths in the same direction and a third candidate data set may represent a shift of seven tenths in the same direction. Hence a manner in which the predetermined variables are changed from one application of the transformation to another may be determined to focus on at least one feature, e.g. a local minimum, of a value of a comparison between the candidate data set and the first or second data set. Therefore data at the at least one feature, e.g. local minimum, may be subject to processing to higher resolution than elsewhere. Changing the predetermined variables from one application of the transformation to another in a varying manner may provide for a reduction in computational burden compared with changing the predetermined variables from one application of the transformation to another in a substantially constant manner. However and depending on circumstances it may be necessary to carry out more steps during time critical processing.

More specifically variation in a manner in which the predetermined variables are changed from one application of the transformation to another may be determined in accordance with a multi-parameter functional minimisation approach. For example the multi-parameter functional minimisation approach may comprise application of at least one gradient based algorithm, such as Powell's conjugate gradient descent method or the Levenberg-Marquardt algorithm. Variation in a manner in which the predetermined variables are changed from one application of the transformation to another may be determined in dependence on an outcome of comparisons between one of a first or second data set and candidate data sets.

Where a value of a comparison between two data sets contains a local minimum and a minimum of greater extent elsewhere, which is of greater relevance than the local minimum, there may be a risk of missing the minimum of greater extent when a multi-parameter functional minimisation approach or the like is relied on. Therefore the process may comprise: a first main application of a transformation such that the predetermined variables are changed in a substantially constant manner from one application to another; and a second main application of a transformation such that the predetermined variables are changed in a varying manner from one application to another. The two main applications of the transformation may be carried out in said order, i.e. with the predetermined variables being changed in a substantially constant manner first and with the predetermined variables being changed in a varying manner second. The first main application of the transformation may be such that a smaller number of candidate data sets are generated than would otherwise be generated were the transformation to be applied solely on the basis of predetermined variables that are subject to substantially constant change from application to application. For example the first main application may involve the generation of 1% of the candidate data sets that would be generated when relying solely on predetermined variables that are subject to substantially constant change from application to application. The extent to which a smaller number of candidate data sets are generated may depend on the nature of the information contained in the reference data set. Nevertheless the combining of the two main approaches to applying the transformation may achieve a reduction in computational burden whilst improving upon an extent of registration or conformity between images.

Alternatively or in addition the transformation may be one of: a linear transformation, e.g. an affine transformation; and non-linear transformation, e.g. a non-linear warp transformation, such as an elastic transformation. The composition of two linear transformations, such as affine transformations, may be achieved with a lower processing burden compared with the composition of non-linear transformations. A transformation may be algebraic or in the form of a mapping. An elastic deformation may be based on a displacement vector field. A linear transformation may be appropriate for a rigid body, such as a person's skull, and a non-linear transformation may be appropriate for a deformable body, such as a length of a person's intestine. Alternatively an affine transformation may be modified as it is applied to achieve a non-linear transformation and thereby model the behaviour of a deformable body. More specifically the transformation may be an affine transformation comprising variables for performing at least one of: at least one translation; at least one rotation; at least one scale; and at least one shear. More specifically the affine transformation may comprise variables for performing: translations in each of three mutually orthogonal directions; rotation about each of three mutually orthogonal axes; scales along each of three mutually orthogonal directions; and shears along each different pair of three mutually orthogonal directions. Thus the affine transform may consist of twelve variables. Hence and as described below a compressed data set that has been compressed in dependence on the affine transformation may consist of twelve data elements.

The step of comparing a data set with a candidate data set may comprise comparing by means of at least one of: estimation of likelihood; a chi-squared test; and mutual information. A mutual information approach may be applied where the data sets are representations of the physical object obtained by a different or the same form of sensing apparatus, i.e. where the data sets are multimodal or in the same modality.

The process may further comprise compressing each of the plurality of candidate data sets to form a respective compressed candidate data set and compressing each of the first and second data sets to form compressed first and second data sets. Therefore each of the first and second compressed data sets may be compared with each of the compressed candidate data sets to thereby determine the compressed candidate data set corresponding to each of the compressed first and second data sets. Alternatively and in certain forms of the invention, e.g. where the comparison of data sets is to be carried out as part of a non time critical process, data sets may not be compressed. More specifically the compressing of a data set may comprise: determining a plurality of weighting vectors in dependence on predetermined variables of a transformation used to obtain the candidate data sets, the number of weighting vectors being equal to the number of predetermined variables; multiplying all data in a data set by each weighting vector to provide data elements of a compressed data set. Hence the computational burden involved in comparing the first and second data sets with the candidate data sets may be lightened.

In their most basic form the weighting vectors may be binary. Hence the weighting vectors may be operative as a mask to, for example, select at least one portion of the data. Alternatively the step of determining a plurality of weights may comprise determining a rate of change of a data set, which is undergoing compression, with respect to at least one of the predetermined variables. The rate of change may have the form of a vector. More specifically each of the plurality of weights may be determined in dependence on a rate of change of the data set with respect to a respective one of the predetermined variables. Further features of this present approach are described in detail in WO 2009/040514.

Alternatively or in addition the first and second data sets may be compared with the candidate data sets by processing apparatus, e.g. a GPU, configured to carry out the comparisons during a predetermined time period.

A data set, such as one of the first and second data sets or the reference data set, may be a representation of at least one physical object in addition to the particular physical object that is to be brought into registration or conformity. For example the first data set may represent an MRI scan of the entire body of a human subject and the second data set may represent a high resolution CT scan of the head of the human subject with the head of the human subject constituting the particular physical object and the human head per se constituting the particular physical object. Therefore the particular physical object may be contained within an area of overlap between the first and second data sets, with either each of the first and second data sets overlapping in part or one of the first and second data sets being within a footprint defined by the other of the first and second data sets.

At least one of the data sets, such as at least one of the first, second and reference data sets, may be a massive data set. At least one of the data sets, such as at least one of the first, second and reference data sets, may be a volumetric data set. At least one of the data sets may be isotropic in at least two of three axes. At least one of the data sets may be anisotropic in one of three axes. Furthermore an amount of data in the anisotropic axis may be less, such as at least ten times less, than the amount of data in each of the other two axes. For example a data set may contain 512 by 512 by 30 elements of data.

Alternatively or in addition at least one data set may comprise at least substantially 50 Mb of data. More specifically a data set may comprise at least substantially 100 Mb of data, substantially 250 Mb of data, substantially 500 Mb of data or substantially 1 Tb of data.

The sensing apparatus may be configured to obtain data from a physical object in at least one of a non-invasive manner and a non-destructive manner. A data set may be a representation of a physical object in at least two dimensions. The sensing apparatus may be configured to be operative as imaging apparatus. For example and in the medical field the sensing apparatus may be one of Computed Tomography (CT) apparatus and Magnetic Resonance Imaging (MRI) apparatus. For example and in the quality control and safety engineering fields the sensing apparatus may be one of ultrasonic imaging apparatus and electrical impedance imaging apparatus applied in the detection of cracks in pipes and the like.

The step of having a plurality of candidate data sets may comprise keeping the first plurality of candidate data sets. The at least a first plurality of candidate data sets may be kept on a temporary or permanent basis. Candidate data sets might for example be stored on a temporary or perhaps even momentary basis in a processor memory cache.

The process may further comprise acquiring at least one of the first and second data sets by electronic methods. More specifically the step of acquiring the at least one data set may be performed by at least one of: an MRI scanner; a Computed Tomography (CT) scanner; a Positron Emission Tomography (PET) scanner; ultrasound apparatus; and X-ray apparatus.

Alternatively or in addition the process may further comprise providing a registered or conforming data set in dependence on the step of bringing the first and second data sets into registration or conformity with each other. More specifically the process may further comprise conveying the registered or conforming data set to at least one of: a Visual Display Unit (VDU); a film; and a Picture, Archiving and Communications (PACS) system. Alternatively or in addition the process may further comprise converting the registered or conforming data set to a Digital Imaging and Communications in Medicine (DICOM) format.

A data set may be in machine readable form. Hence at least one data set may be in the form of digital data. At least one data set may comprise image data at least in part. The step of comparing a data set with candidate data sets may be performed by digital processing. The step of bringing first and second data sets into registration or conformity may be performed by digital processing. At least one of the candidate data sets, the transformations and parameters thereof may be kept, e.g. stored, as an electronic signal. Generation of at least one of a candidate data set and a reference data set may be by operation of at least one of: a Central Processing Unit (CPU); and a Graphics Processing Unit (GPU). Comparison of a data set with a candidate data set may be by operation of at least one of: a Central Processing Unit (CPU); and a Graphics Processing Unit (GPU).

According to a second aspect of the present invention there is provided a computer program comprising program instructions for causing a computer to perform the process according to the first aspect of the present invention.

Candidate data sets may be derived from the reference data set at a time in advance of the use of the candidate data sets and their associated transformations according to the present invention and also perhaps at a location apart from where the candidate data sets and the transformations are used. More specifically the computer program may be one of: embodied on a record medium; embodied in a read only memory; stored in a computer memory; and carried on an electrical carried signal.

Further embodiments of the second aspect of the present invention may comprise one or more features of the first aspect of the present invention.

According to a third aspect of the present invention there is provided a computer system comprising program instructions for causing a computer to perform the process according to the first aspect of the present invention.

More specifically the program instructions may be at least one of: embodied on a record medium; embodied in a read only memory; stored in a computer memory; and carried on an electrical carried signal.

Further embodiments of the third aspect of the present invention may comprise one or more features of the first aspect of the present invention.

According to a fourth aspect of the present invention there is provided electrical apparatus operative to bring a first data set and a second data set into registration or conformity with each other, each of the first and second data sets being a representation of a particular physical object, the electrical apparatus comprising a digital processor and a data store, the data store being operative to store: a plurality of candidate data sets, each candidate data set being a differently shifted or distorted form of a reference data set, the reference data set being a representation of the physical object; and the digital processor being operative: to compare the first data set with each of the candidate data sets and, in dependence on the comparisons, to determine a first transformation that brings the candidate data set, which of the plurality of candidate data sets provides a best match with the first data set, and the reference data set into registration or conformity with each other; to compare the second data set with each of the candidate data sets and, in dependence on the comparisons, to determine a second transformation that brings the candidate data set, which of the plurality of candidate data sets provides a best match with the second data set, and the reference data set into registration or conformity with each other; and to bring the first and second data sets into registration or conformity with each other in dependence on the first and second transformations.

More specifically, the electrical apparatus may further comprise at least one of: a Central Processing Unit (CPU); and a Graphics Processing Unit (GPU).

Further embodiments of the fourth aspect of the present invention may comprise one or more features of any previous aspect of the present invention.

Instead of the reference data set being a representation of the physical object, e.g. an earlier acquired image of a particular patient's hand, the reference data set may have been configured such that each of substantially all data sets representing different forms of the same type of physical object and to which type the particular physical object belongs can be registered with or brought into conformity with the reference data set. The present inventors have appreciated that this feature may be of wider application than hitherto described. According to a fifth aspect of the present invention there is therefore provided a process of bringing a first data set and a second data set into registration or conformity with each other by electronic methods, each of the first and second data sets being a representation of a particular physical object, the process comprising:

having a plurality of candidate data sets, each candidate data set being a differently shifted or distorted form of a reference data set, the reference data set having been configured such that each of substantially all data sets representing different forms of the same type of physical object and to which type the particular physical object belongs can be registered with or brought into conformity with the reference data set;

comparing the first data set with each of the candidate data sets and in dependence on the comparisons determining a first transformation that brings the candidate data set, which of the plurality of candidate data sets provides a best match with the first data set, and the reference data set into registration or conformity with each other;

comparing the second data set with each of the candidate data sets and in dependence on the comparisons determining a second transformation that brings the candidate data set, which of the plurality of candidate data sets provides a best match with the second data set, and the reference data set into registration or conformity with each other; and bringing the first and second data sets into registration or conformity with each other in dependence on the first and second transformations.

The process according to the present aspect is the same as according to the first aspect with the exception that the reference data set has been configured such that each of substantially all data sets representing different forms of the same type of physical object can be registered with or brought into conformity with the reference data set. In view of the reference data set representing different forms of the same type of physical object, such as different forms of a Caucasian head or a child's hand, the reference data set and perhaps also the derived candidate data sets may be formed as part of a non time critical process, e.g. during pre-processing. Depending on the form of application of the invention, the comparison steps may also be carried out as part of a non time critical process or they may be carried out during time critical processing, e.g. during a consultation when CT images are being acquired. More specifically the reference data set and the derived candidate data sets may be formed and stored, e.g. as part of a library of reference data sets and their derived candidate data sets, for subsequent use with different forms of the same type of physical object. For example candidate data sets derived from a reference data set which represents a Caucasian head may be used on different subsequent occasions for registration of CT images from different Caucasian subjects. As a further example candidate data sets derived from a reference data set which represents a child's hand may be used at different subsequent occasions for registration of CT images from different children. As described above with reference to the first aspect at least one of the first and second transformations may be determined and stored for later use.

Alternatively or in addition the reference data set may represent at least one feature common to substantially all different forms of the same type of physical object to which the particular physical object belongs. For example and in medical imaging a common feature might be a part of the anatomy that has a particular shape, such as the skull, or an area having a particular colour change profile, such as a change from light to dark within certain bounds of rate of change. Further examples drawn from the field of medical imaging include distances between parts of image, e.g. the distance between the eyes, or a radius of curvature of a part of the anatomy, e.g. a radius of curvature of the skull. A reference data set may be formed by aggregating data sets acquired from each of plural different physical objects of the same type, such as an image of a hand acquired from each of various children in a particular age range. Data sets from at least several hundred different physical objects of the same type may be used to form the reference data set. The reference data set may therefore constitute a data set that is representative of or typical of a type of physical object. The reference data set may be formed by summing a predetermined number of data sets acquired from each of plural different physical objects and dividing the summed data by the predetermined number.

Alternatively or in addition the reference data set may be formed by isolating features from data sets acquired from each of plural different physical objects of the same type. The features may be isolated manually, e.g. by an operator manipulating data sets manually by way of an appropriate software program. Alternatively or in addition the features may be isolated by using an appropriate analytical approach, such as Principal Component Analysis (PCA), which is operative on electronic apparatus such that no direct manual intervention is required.

In a form of the invention the process may comprise applying a transformation to solely one reference data set, the reference data set being a representation of a type of physical object obtained by a particular sensing apparatus, such as imaging apparatus. For example the reference data set may be based upon data obtained by the particular sensing apparatus, such as image data obtained by scanning a physical object, e.g. a part of the human anatomy, with Computed Tomography (CT) apparatus. Also each of the first and second data sets may be compared with each of the candidate data sets for the same reference data set. Thus the present form of the invention may be appropriate for registration of first and second data sets where both first and second data sets are obtained by the same sensing apparatus, e.g. by Computed Tomography (CT) apparatus. The first and second data sets may be representations of a particular physical object obtained by the same sensing apparatus at different times, e.g. a second data set obtained presently by a CT scan and a first data set obtained by a CT scan some weeks earlier.

In another form of the process may comprise applying a transformation to each of first and second reference data sets to thereby provide respective first and second pluralities of candidate data sets, the first and second reference data sets being representations of a type of physical object obtained by different sensing apparatus, such as different forms of imaging apparatus, e.g. CT apparatus and Magnetic Resonance Imaging (MRI) apparatus. The transformation applied to the first reference data set may be different to the transformation applied to the second data set. Alternatively or in addition predetermined variables of the first and second data sets may be changed in a different manner during application of each data set to its respective reference data set. Thus the present form of the invention may be appropriate for registration of first and second data sets where the first and second data sets are obtained by different sensing apparatus, e.g. by CT and MRI apparatus. The first and second data sets may be representations of a particular physical object obtained by different sensing apparatus at different times or substantially a same time, e.g. a second data set obtained by a CT scan during a present appointment and a first data set obtained by a MRI scan during the same appointment. Data from different sensing apparatus may contain different information about a particular physical object, which is of increased value, e.g. for diagnostic purposes, when the data from the two sensing apparatus are considered together. Hence it may be advantageous to have the capability to bring such first and second data sets into conformity or registration with each other.

More specifically the first data set may be compared with each of the candidate data sets based upon the first reference data set and, in dependence on the comparisons, a first transformation that has generated the candidate data set providing a best match to the first data set may be determined. Also the second data set may be compared with each of the candidate data sets based upon the second reference data set and, in dependence on the comparisons, a second transformation that has generated the candidate data set providing a best match to the second data set may be determined.

More specifically the process may further comprise determining a reference transformation that brings the first and second reference data sets into registration or conformity with each other. Hence the first and second data sets, which are representations of a type of physical object obtained by different sensing apparatus, may be brought into conformity or registration with each other in dependence on the first and second transformations and the reference transformation. More specifically the first and second data sets may be brought into registration or conformity with each other in dependence on: one of the first and second transformations; the inverse of the other of the first and second transformations; and one of the reference transformation and an inverse of the reference transformation. For example and where the first data set is from an MRI scan and the second data set is from a CT scan, where the first and second reference data sets are based on MRI and CT scans respectively and where the reference transformation brings the second reference data set into registration or conformity with the first reference data set, if one were to bring the second (CT) data set into registration with the first (MRI) data set each of the first transformation, the reference transformation and the inverse of the second transformation would be applied to the second (CT) data set.

Alternatively or in addition the reference transformation may be determined by an operator manually, e.g. by the operator manually linking data sets obtained by different sensing apparatus by way of an appropriate software program. Alternatively or in addition the reference transformation may be determined by an appropriate analytical approach, such as a mutual information approach, which is operative on electronic apparatus such that no direct manual intervention is required. Further embodiments of the fifth aspect of the present invention may comprise one or more features of any previous aspect of the present invention.

According to a sixth aspect of the present invention there is provided a computer program comprising program instructions for causing a computer to perform the process according to the fifth aspect of the present invention. Embodiments of the sixth aspect of the present invention may comprise one or more features of any previous aspect of the present invention. According to a seventh aspect of the present invention there is provided a computer system comprising program instructions for causing a computer to perform the process according to the fifth aspect of the present invention. Embodiments of the seventh aspect of the present invention may comprise one or more features of any previous aspect of the present invention.

According to an eighth aspect of the present invention there is provided electrical apparatus operative to perform the process according to the fifth aspect of the present invention, the electrical apparatus comprising a digital processor and a data store, the data store being operative to store the plurality of candidate data sets and the digital processor being operative to compare the first and second data sets with the candidate data sets, to determine the first and second transformations and to bring the first and second data sets into registration or conformity with each other. Embodiments of the eighth aspect of the present invention may comprise one or more features of any previous aspect of the present invention.

According to a further aspect of the present invention there is provided a process of bringing a first data set and a second data set into registration or conformity with each other, each of the first and second data sets being a representation of a particular object, the process comprising: having at least a first plurality of candidate data sets, each candidate data set in a plurality of candidate data sets being a differently shifted or distorted reference data set; comparing the first data set with each of the candidate data sets and in dependence on the comparisons determining a first transformation that brings the candidate data set, which of the plurality of candidate data sets provides a best match with the first data set, and the reference data set into registration or conformity with each other; comparing the second data set with each of the candidate data sets and in dependence on the comparisons determining a second transformation that brings the candidate data set, which of the plurality of candidate data sets provides a best match with the second data set, and the reference data set into registration or conformity with each other. Embodiments of the further aspect of the present invention may comprise one or more features of any previous aspect of the present invention.

According to a yet further aspect of the present invention there is provided electrical apparatus operative perform the process according to the further aspect of the present invention, the electrical apparatus comprising a processor and a data store, the data store being operative to store the candidate data sets and the processor being operative: to compare the first and second data sets with the candidate data sets; to determine the first and second transformations; and to bring the first and second data sets into registration or conformity with each other. Embodiments of the yet further aspect of the present invention may comprise one or more features of any previous aspect of the present invention.

BRIEF DESCRIPTION OF DRAWINGS

Further features and advantages of the present invention will become apparent from the following specific description, which is given by way of example only and with reference to the accompanying drawings, in which:

FIG. 2A represents how registration of two MRI images is accomplished;

FIGS. 3A and 3B are flow chart representations of a process according to the first embodiment;

DESCRIPTION OF EMBODIMENTS

Figure 1:
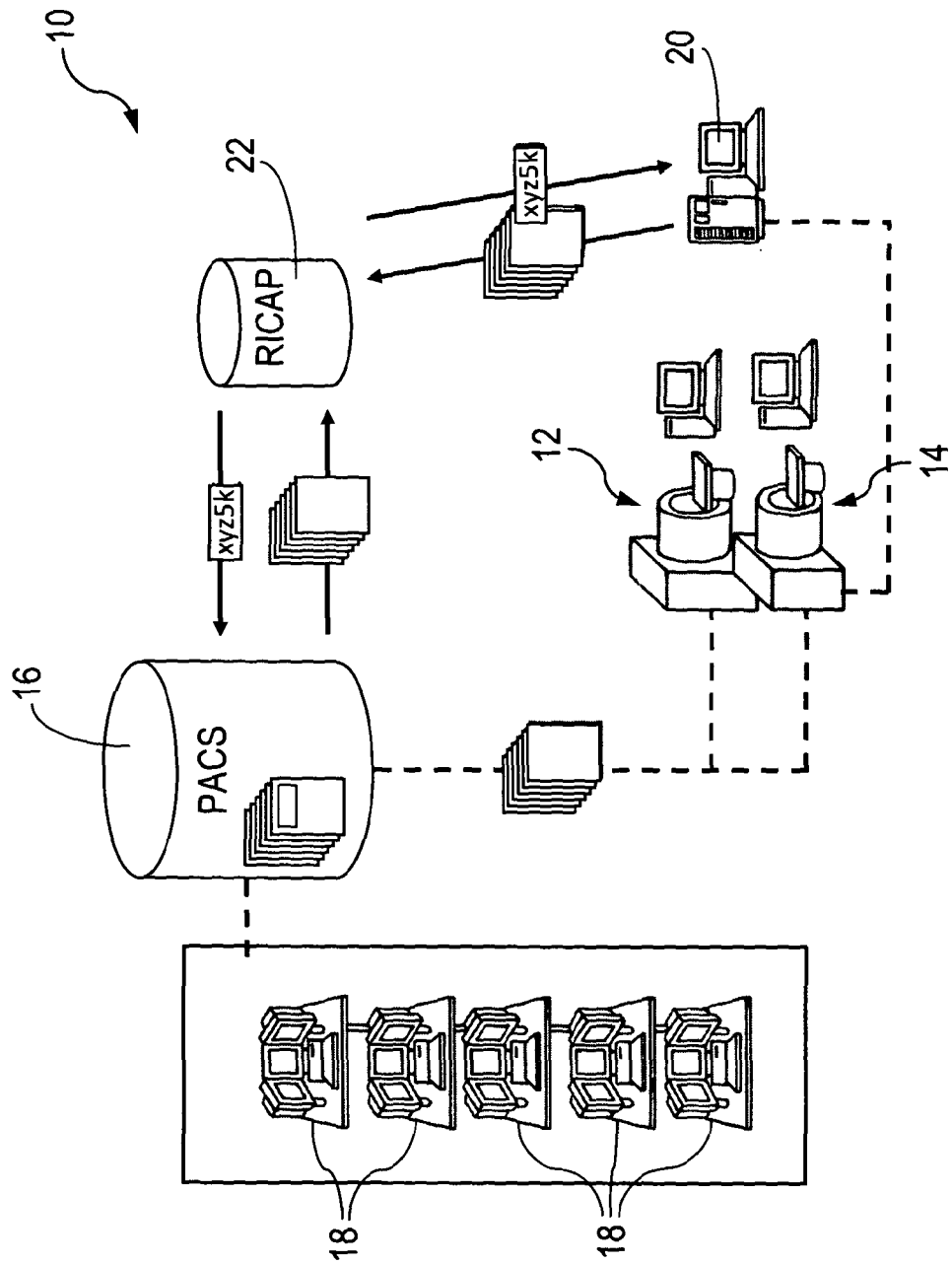
FIG. 1 is a block diagram representation of apparatus according to the present invention.

An apparatus that is operable according to the present invention is shown in block diagram form in FIG. 1. The apparatus comprises a Magnetic Resonance Imaging (MRI) scanner 12 and a Computed Tomography (CT) scanner 14, each of which is operable to acquire images (which constitute representations) from a part of a human or animal subject or indeed an inanimate object that is susceptible to scanning with MRI and CT scanners. The apparatus further comprises a Picture, Archiving and Communications (PACS) apparatus 16, which stores image data in a Digital Imaging and Communications in Medicine (DICOM) format, and several workstations 18 for radiologists. The workstations may be located in different locations, e.g. at different locations within the same building as the CT and MRI scanners or at locations in different buildings. Each of the workstations has a thin client architecture and is in electrical communication with the PACS apparatus by way of a fast communications channel. A dedicated radiologist's workstation 20 is located adjacent the MRI and CT scanners 12, 14, with the dedicated radiologist's workstation 20 being configured for receiving image data from the MRI and CT scanners 12, 14 and for analysis of received data. In addition the apparatus comprises a registration processing apparatus 22, which is located remote from and in electrical communication with each of the PACS apparatus 16 and the dedicated radiologist's workstation 20. The registration processing apparatus 22 comprises a Central Processing Unit (CPU) or Graphics Processing Unit (GPU) of well known form and associated data storage. The registration processing apparatus 22 is programmed to perform the process of the present invention by program instructions of conventional form that are stored in read only memory, computer memory or on a record medium, such as an optical disc. As will become apparent from the following description FIG. 1 shows two ways in which the present invention may be embodied: firstly by way of communication between the registration processing apparatus 22 and the PACS apparatus 16; and secondly by way of communication between the registration processing apparatus 22 and the dedicated radiologist's workstation 20.

FIG. 2A represents how registration of two images from the same kind of imaging apparatus, e.g. two MRI scanners, is accomplished according to a first embodiment of the invention. According to the present example a currently acquired MRI image 24 (a second MRI image) of a child's hand is to be brought into registration or conformity with another MRI image 26 (a first MRI image) of the same child's hand, which was acquired during an earlier consultation some weeks before. A reference MRI image 28 is constituted by another earlier acquired MRI image, which is either a further image of the same child's hand or an image of another child's hand. Where the reference MRI image 28 is constituted by an image of another child's hand, the present child's hand and the other child's hand should be sufficiently similar in respect of their dimensions and density of anatomy to enable images of their hands to be brought into registration with each other. A first transformation, $T_2$, that brings the first MRI image 26 into registration with the reference MRI image 28 has already been determined when the first MRI image 26 was acquired, with the first transformation, $T_2$, being stored in the meantime. Upon acquisition of the second MRI image 24, a second transformation, $T_1$, that brings the second MRI image 24 into registration with the reference MRI image 28 is determined. The second MRI image 24 is then brought into registration with the first MRI image 26 by composing the second transformation, $T_1$, and the inverse of the first transformation, $T_2$, and applying the composition to the second MRI image 24. According to another application based on the present example the first and second transformations are both stored at their time of determination and at a later stage the stored transformations (and their inverses as appropriate) are used to bring one of the stored MRI images into registration or conformity with the other MRI image.

Figure 2B:
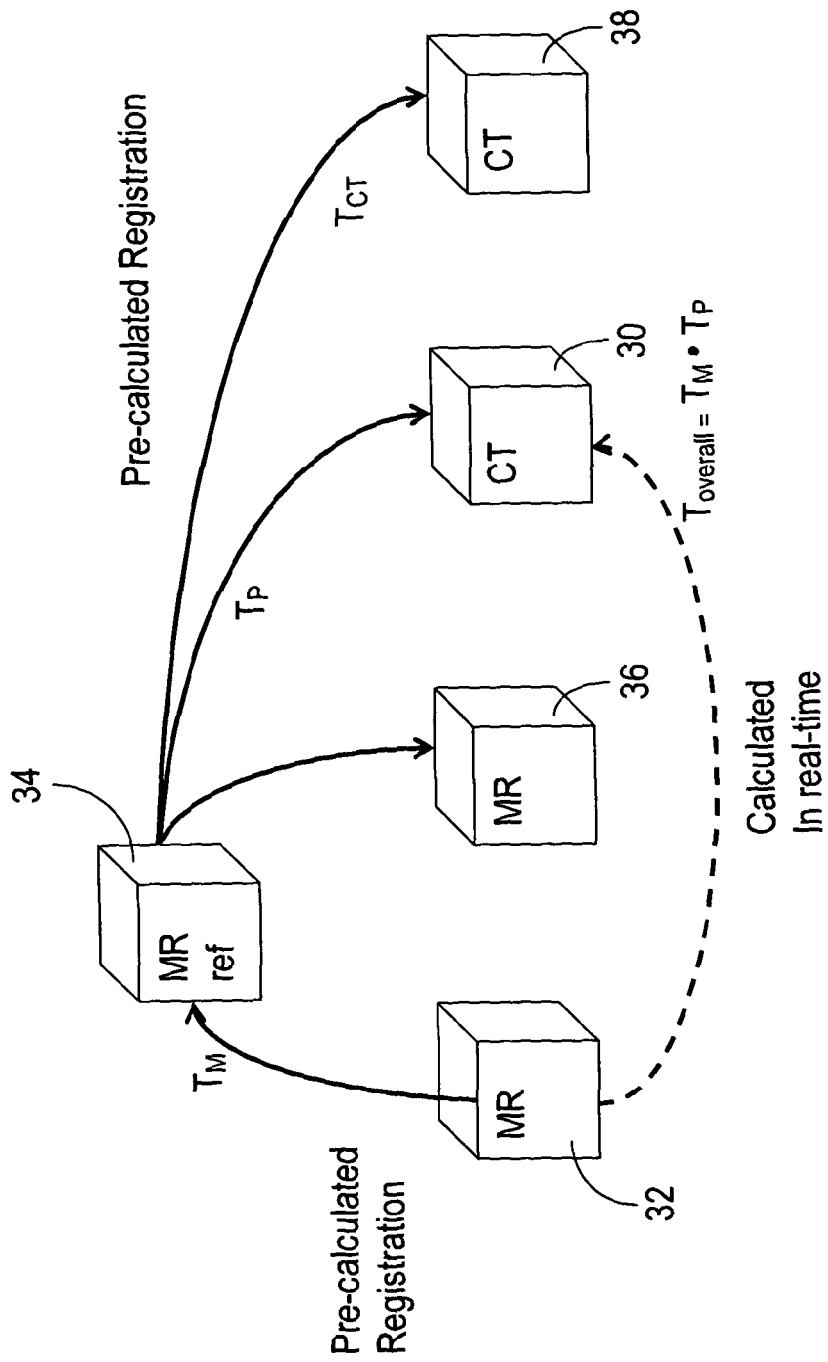
FIG. 2B represents how registration of a CT image and an MRI image is accomplished according to a first embodiment.

FIG. 2B shows a more sophisticated example of registration according to the first embodiment in which an MRI image and a CT image are brought into registration or conformity with each other. According to this embodiment a currently acquired MRI image 32 of a child's hand is to be brought into registration or conformity with a CT image 30 of the same child's hand, which was acquired during an earlier consultation some weeks before. A reference MRI image 34 is constituted by an earlier acquired MRI image, which is either a further image of the same child's hand or an image of another child's hand. Where the reference MRI image 34 is constituted by an image of another child's hand, the present child's hand and the other child's hand should be sufficiently similar in respect of their dimensions and density of anatomy to enable images of their hands to be brought into registration with each other. FIG. 2B also shows a second MRI image 36 and a second CT image 38, which were acquired during earlier consultations. A first transformation, $T_P$, that brings the reference MRI image 34 into registration with the earlier acquired CT image 30 has already been determined when the CT image 30 was acquired with the first transformation being stored in the meantime. Upon acquisition of the MRI image 32 a second transformation, $T_M$, that brings the currently acquired MRI image 32 into registration with the reference MRI image 34 is determined and stored. The currently acquired MRI image 32 is then brought into registration with the CT image 30 by composing the second transformation, $T_M$, with the first transformation, $T_P$, and applying the composition to the MRI image 32. One of any of the MRI images 32, 36 and the CT images 30, 38 can be brought into registration with another of the MRI images 32, 36 and the CT images 30, 38 by determination of their corresponding transformations, composition of the appropriate transformations and application of the composition to an image. According to another application based on the present example the transformations are stored at their time of determination and at a later stage the appropriate stored transformations (and their inverses as required) are used to bring one of the stored images into registration or conformity with one of the other stored images.

A second embodiment of the present invention involving registration of two images from the same kind of imaging apparatus will now be described with reference to FIG. 2A. The process according to this second embodiment is the same as according to the first embodiment with the following exception. Instead of being an earlier acquired image of an object the reference MRI image 28 is formed at an earlier stage such that it is characteristic of the present type of physical object being scanned, e.g. such that it is characteristic of the hands of children between particular ages. The formation of the reference MRI image 28 according to this second embodiment is described below with reference to FIG. 4A. Otherwise the process according to the second embodiment is the same as the process according to the first embodiment. More specifically a first transformation, $T_2$, that brings the first MRI image 26 into registration with the reference MRI image 28 has already been determined when the first MRI image 26 was acquired with the first transformation, $T_2$, being stored in the meantime. Upon acquisition of the second MRI image 24, a second transformation, $T_1$, that brings the second MRI image 24 into registration with the reference MRI image 28 is determined and stored. The second MRI image 24 is then brought into registration with the first MRI image 26 during a time critical process by composing the second transformation, $T_1$, and the inverse of the first transformation, $T_2$, and applying the composition to the second MRI image 24.

Figure 2C:
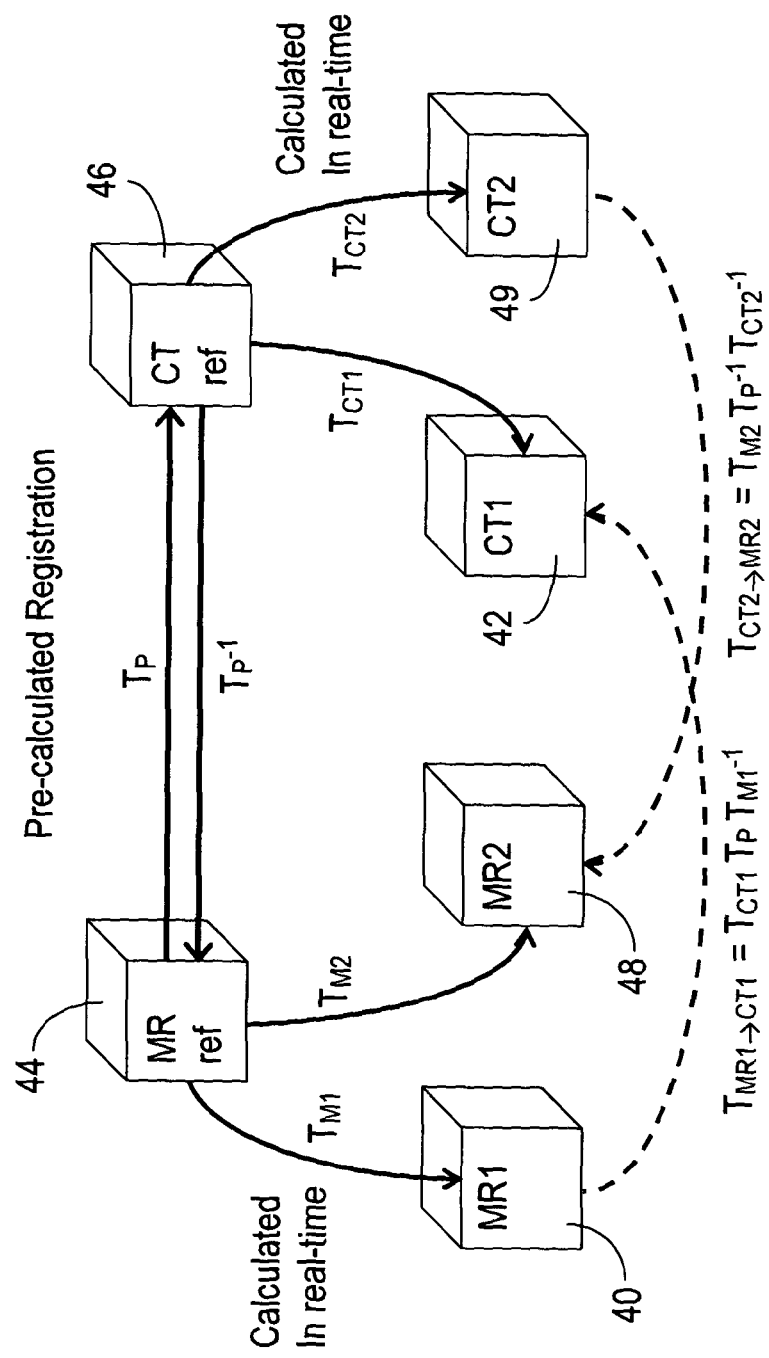
FIG. 2C represents how registration of a CT image and an MRI image is accomplished according to a second embodiment.

FIG. 2C shows a more sophisticated approach to registration according to the second embodiment in which an MRI image and a CT image are brought into registration or conformity with each other. According to a first present example an MRI image 40 of a child's hand, which was acquired during an earlier consultation some weeks before, is to be brought into registration or conformity with a currently acquired CT image 42 of the same child's hand. A reference MRI image 44 and a reference CT image 46, which are each characteristic of the present type of physical object being scanned, i.e. characteristic of the hands of children between particular ages, are formed at an earlier stage. In addition a reference transformation, $T_P$, that brings the reference MRI image 44 into registration or conformity with the reference CT image 46 is determined at an earlier stage. Furthermore a first transformation, $T_{M1}$, that brings the reference MRI image 44 into registration with the MRI image 40 has already been determined when the MRI image 40 was acquired with the first transformation being stored in the meantime. Upon acquisition of the CT image 42 a second transformation, $T_{CT1}$, that brings the reference CT image 46 into registration with the currently acquired CT image 42 is determined. The MRI image 40 is brought into registration with the CT image 42 by composing the inverse of the first transformation, $T_{M1}$, the reference transformation, $T_P$, and the second transformation, $T_{CT1}$, and applying the composition to the MRI image 40. According to a second present example the plural MRI images 40, 48 and plural CT images 42, 49 are acquired and a transformation, $T_{M1}$, $T_{M2}$, $T_{CT1}$, $T_{CT2}$, is determined and stored for each of the four images at its time of acquisition. At a later stage it is desired to bring the second one 49 of the stored CT images into registration with the second one 48 of the stored MRI images. Therefore the inverse of the corresponding first transformation, $T_{CT2}$, the inverse of the reference transformation, $T_P$, and the corresponding second transformation, $T_{M2}$, are composed and the composition applied to the second one 49 of the stored CT images to effect registration.

A process according to the first embodiment in which two images are brought into registration or conformity with each other will now be described with reference to the flow charts 50, 70 shown in FIGS. 3A and 3B and earlier described FIGS. 1 and 2B. An MRI image 34 of a patient is acquired 52 with the MRI scanner 12; the MRI image 34 constitutes a reference image. Candidate images are formed by applying a transformation to the reference MRI image 34 such that each candidate image is a differently shifted or distorted form of the reference image. The means by which the transformation is applied to the reference image is described below with reference to FIGS. 4A and 4B. A further MRI image 32 of the patient is acquired with the MRI scanner 12 at a later stage 54. The MRI image 32 is compared with each of the candidate images to determine the candidate image that matches the MRI image 32 most closely. Comparison is by a technique such as mutual information. The form of the transformation associated with the matching candidate image constitutes the first transformation, i.e. the transformation that brings the reference MRI image 34 into registration with the later acquired MRI image 32, 56. The first transformation is stored in the PACS apparatus 16 with the MRI image 32, 58. A CT image 30 is acquired by the CT scanner 14 at a subsequent consultation 60. The CT image 30 is compared with each of the candidate images to determine the candidate image that matches the CT image 30 most closely. Comparison is by a technique such as mutual information. The form of the transformation associated with the matching candidate image constitutes the second transformation, i.e. the transformation that brings the reference MRI image 34 into registration with the CT image 30, 62. The second transformation is stored in the PACS apparatus 16 with the CT image 30, 64. According to an application of the present process the preceding steps are carried out during a pre-processing stage. Subsequent steps of the present process that are carried out during a time critical stage are shown in FIG. 3B. The time critical stage might, for example, be constituted by an analysis by a radiologist of many images acquired over several consultations to determine changes in pathology. Proper registration of the images is required to readily identify and determine the nature of such changes. Referring to FIG. 1 the radiologist carries out the analysis on one of the several networked workstations 18 or on the dedicated workstation 20. The images, which are to be the subject of analysis, are stored on either the PACS apparatus 16 or similar such storage apparatus which is in communication with the apparatus 10 of FIG. 1 by way of a low bandwidth channel. It is therefore advantageous where the analysis is being carried out in real or near real time to reduce the extent to which images, which normally constitute large volumes of data, are conveyed between their stored location and the registration processing apparatus 22. Turning now to FIG. 3B the MRI image 32 and its associated first transformation are conveyed from their storage location 72, 74 to the registration processing apparatus 22. Also the CT image 30 and its associated second transformation are conveyed from their storage location 76, 76 to the registration processing apparatus 22. Then the registration processing apparatus 22 is operative to compose one of the first and second transformations with an inverse of the other of the first and second transformations 80 depending on whether the MRI image 32 is to be brought into registration with the CT image 30 or vice-versa. The composition is then applied to whichever one of the MRI image 32 and the CT image 30 is to be brought into registration with the other to thereby bring the images into registration with each other. Finally the registered images are conveyed from the registration processing apparatus 22 for display on the radiologist's workstation. Although the aforegoing description relates to the registration of images acquired with different forms of scanning apparatus, i.e. an MRI scanner and a CT scanner, the process is operable with images from the same form of scanning apparatus, e.g. an MRI scanner as represented in FIG. 2A.

A process according to the second embodiment in which two MRI images are brought into registration or conformity with each other will now be described with reference to the flow chart 150 shown in FIG. 4A and FIGS. 1 and 2A. The process commences with the formation of a reference image 152 which is characteristic of a type of object that is to be subject to registration. The reference image is characteristic of the type of object obtained with an MRI scanner. The reference image is formed by aggregating many MRI images obtained from different forms of the same type of object so as to obtain a reference that contains features common to all forms of that type of object. For example and where the type of object is the hand of a child between certain ages, MRI scans of many different children of this age group are obtained and aggregated. Aggregation is by manual operation with an operator manipulating images manually by way of an appropriate graphics handling program. Alternatively aggregation involves an analytical approach, such as Principle Components Analysis (PCA), which is operative on electronic apparatus such as the registration processing apparatus 22, such that no manual intervention is required. A library of such reference images might be formed for different parts of the anatomy, for parts of the anatomy of different types, e.g. hands of children versus hands of adults, and for images obtained by different imaging apparatus. Thereafter the form of a transformation is determined 154 and candidate images 156 are formed by applying the transformation to the reference image such that each candidate image is a differently shifted or distorted form of the reference image. More specifically the transformation is of linear form where the physical object is rigid, e.g. a human head, or non-linear where the physical object is deformable, e.g. a portion of human intestine. An affine transformation provides a linear transformation and has variables for performing: translations in each of three mutually orthogonal directions, i.e. x, y and z directions; rotation about each of three mutually orthogonal axes, i.e. x, y and z axes; scales along each of three mutually orthogonal directions, i.e. x, y and z directions; and shears along pairs of three mutually orthogonal directions, i.e. x, y and z directions. Such an affine transformation consists of twelve variables. The derivation of a matrix affine transform of appropriate general form is described in WO 2009/040514. The affine transformation is applied repeatedly to the reference image with values of the variables in the affine transformation being changed from application to application such that a different candidate image is generated each application. The generated candidate images are stored along with their associated transformations, e.g. in the registration processing apparatus 22. As an alternative to the linear affine transformation, an elastic transformation, such as a thin plate spline, is applied where a non-linear transformation is required. An example of a thin plate spline is provided at: http:mathworld.wolfram.com/ThinPlateSpline.html.

In a form of the embodiment the variables of the transformation are changed in a substantially constant manner between applications of the transformations to an image. The transformation is therefore applied in a consistent fashion. Each of the candidate images is then formatted 156. Affine transformation of a square image may, for example, produce a candidate image in the form of a parallelogram having angles that are less than or greater than 90 degrees. Thus the elements of a candidate image will not have the same spatial disposition as elements of the square reference image or square acquired images. The formatting step changes the elements of a candidate image such that they have the same spatial disposition as elements of reference and acquired images. Each element of the candidate image is changed by interpolation between the element to be changed and neighbouring elements to determine a value for the changed element at its new location.

Each of the candidate images is compressed 158 using the compression process described below and the compressed candidate images are stored, e.g. in the PACS apparatus 16. In an alternative approach no compression of the candidate images takes place. Hence acquired images, which are described further below, are not compressed either such that uncompressed acquired images are each compared with uncompressed candidate images.

The steps described thus far are carried out in advance of the application of the invention with acquired images. For example the thus far described steps may be carried out by an agency other than the operator of the scanning apparatus, e.g. a vendor.

Thereafter an image of, for example, a particular child's hand is acquired by the MRI scanner 12, 160 and stored in the PACS apparatus 16. The MRI image is conveyed to the registration processing apparatus 22 where the MRI image is compressed 162 by means of the compression process described below and compared with each compressed candidate MRI image 164 to determine the closest matching candidate MRI image. The comparison is carried out by means of an estimation of likelihood or chi-squared test. The estimation of likelihood and chi-squared test will be described no further as they are well known to and will be readily applied to the present invention by the skilled reader. Then the transformation corresponding to the closest matching candidate MRI image is identified 166; this constitutes the first transformation, which is stored for subsequent use.

At a later stage a second MRI image of the same child's hand is acquired by the MRI scanner 12, 168 and stored in the PACS apparatus 16. The second MRI image is conveyed to the registration processing apparatus 22 where the second MRI image is compressed 170 by means of the compression process described below and compared 172 with each compressed candidate MRI image to determine the closest matching candidate MRI image. The comparison is carried out by means of an estimation of likelihood or chi-squared test. Then the transformation corresponding to the closest matching candidate MRI image is identified 174; this constitutes the second transformation, which is stored for subsequent use.

Upon acquisition of the second MRI image or at a later stage it is desired to bring the first and second MRI images into registration or conformity with each other. Therefore the first and second transformations and their inverses are applied as appropriate to one of the first and second MRI images to bring it into registration with the other of the MRI images 176. This process is illustrated in FIG. 2A. According to another form of the process shown in FIG. 4A the variables of the transformation are changed in a varying manner between applications of the transformations to, for example, focus on one or more parts of an image and thereby reduce upon the processing burden imposed by changing the variables in a substantially constant manner. In this form a multi-parameter functional minimisation approach, such as a gradient based algorithm, is used to determine the manner in which the variables of the transformation are to be changed to bring the images into better registration or conformity. According to this approach a small number of candidate images is formed at step 156 and based on the outcome of the comparison of the acquired image with the candidate data images at step 166 the variables of the transformation are changed before a further set of candidate data images is formed by repetition of step 156 onwards. This process is repeated if a further improvement in registration is desired. This approach is beneficial, e.g. where high precision of registration is desired and a delay, albeit a typically small delay, in processing is acceptable.

Figure 4A:
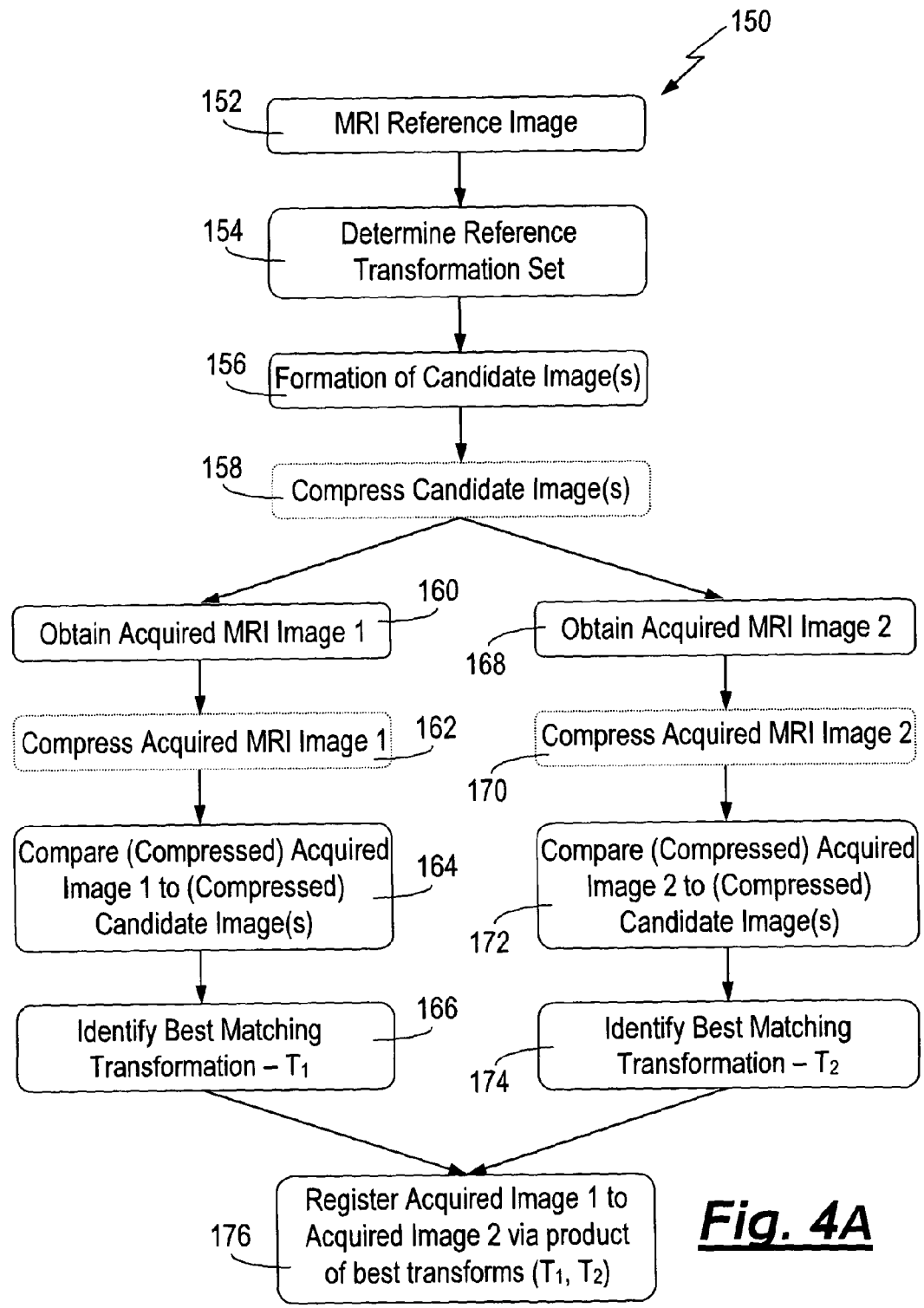
FIG. 4A is a flow chart representation of a process according to the second embodiment and represented in FIG. 2A.

The description provided above with reference to FIG. 4A relates to one of the ways in which the apparatus of FIG. 1 is applied, namely where images from the same kind of apparatus, e.g. an MRI scanner, are brought into registration or conformity with each other. In one form where previously acquired images are to be brought into registration or conformity with each other, data is conveyed between the PACS apparatus 16 and the registration processing apparatus 22. In another form where recently acquired images are to be brought into registration or conformity with each other, data is conveyed between the dedicated radiologist's workstation 20 and the registration processing apparatus 22.

A process according to the present invention in which an MRI image and a CT image are brought into registration or conformity with each other will now be described with reference to the flow chart 180 shown in FIG. 4B and FIGS. 1 and 2C. The process commences with the formation of a CT reference image 182 and an MRI reference image 184, each of which is characteristic of a type of object that is to be subject to registration. Each reference image is formed by the process described above with reference to FIG. 4A. Next a reference transformation between the CT reference image and the MRI reference image is determined 186. The reference transformation is determined by an operator manually, e.g. by the operator manually mapping reference images to each other by way of an appropriate graphics handling program. Alternatively a reference transformation is determined by an analytical approach, such as a mutual information approach, which is operative on electronic apparatus such as the registration processing apparatus 22, such that no manual intervention is required. Thereafter the form of a CT transformation is determined 188 and candidate CT images 190 are formed for the CT reference image by applying the CT transformation to the CT reference image such that each candidate CT image is a differently shifted or distorted CT reference image. As described above with reference to FIG. 4A the transformation is of linear or non-linear form. Reference should be made to the description provided above with reference to FIG. 4A for further details of the transformation. As with the process described with reference to FIG. 4A the variables of the transformation are changed in a substantially constant manner between applications of the transformations to a CT image such that the transformation is applied in a consistent fashion. Thereafter the candidate CT images are formatted and then each of the candidate CT images is compressed 192 using the compression process described below and the compressed candidate CT images are stored, e.g. in the PACS apparatus 16. The thus described process in respect of the formation, formatting and compression of the CT candidate images is repeated in corresponding steps 194, 196, 198 for the MRI reference image. In an alternative approach no compression of the candidate CT and MRI images takes place. Hence acquired CT and MRI images, which are described further below, are not compressed either such that uncompressed acquired images are each compared with uncompressed candidate images. The steps described thus far are carried out in advance of the application of the invention with acquired images. For example the thus far described steps may be carried out by an agency other than the operator of the scanning apparatus, e.g. a vendor.

Thereafter an image of, for example, a particular child's hand is acquired by the CT scanner 14, 200 and stored in the PACS apparatus 16. The CT image is conveyed to the registration processing apparatus 22 where the CT image is compressed 202 by means of the compression process described below and compared with each compressed candidate CT image 204 to determine the closest matching candidate CT image. The comparison is carried out by means of an estimation of likelihood or chi-squared test. Then the transformation corresponding to the closest matching candidate CT image is identified 206; this constitutes the first transformation, $T_{CT}$, which is stored for subsequent use. At a later stage an MRI image of the same child's hand is acquired by the MRI scanner 12, 208 and stored in the PACS apparatus 16. The MRI image is conveyed to the registration processing apparatus 22 where the MRI image is compressed 210 by means of the compression process described below and compared 212 with each compressed candidate MRI image to determine the closest matching candidate MRI image. The comparison is carried out by means of an estimation of likelihood or chi-squared test. Then the transformation corresponding to the closest matching candidate MRI image is identified 214; this constitutes the second transformation, $T_{MRI}$, which is stored for subsequent use.

Upon acquisition of the MRI image or at a later stage it is desired to bring the CT and MRI images into registration or conformity with each other. Therefore the first, second and reference transformations and their inverses are applied as appropriate to one of the CT and MRI images to bring it into registration with the other of the CT and MRI images 216. This process is illustrated in FIG. 2C.

Figure 4B:
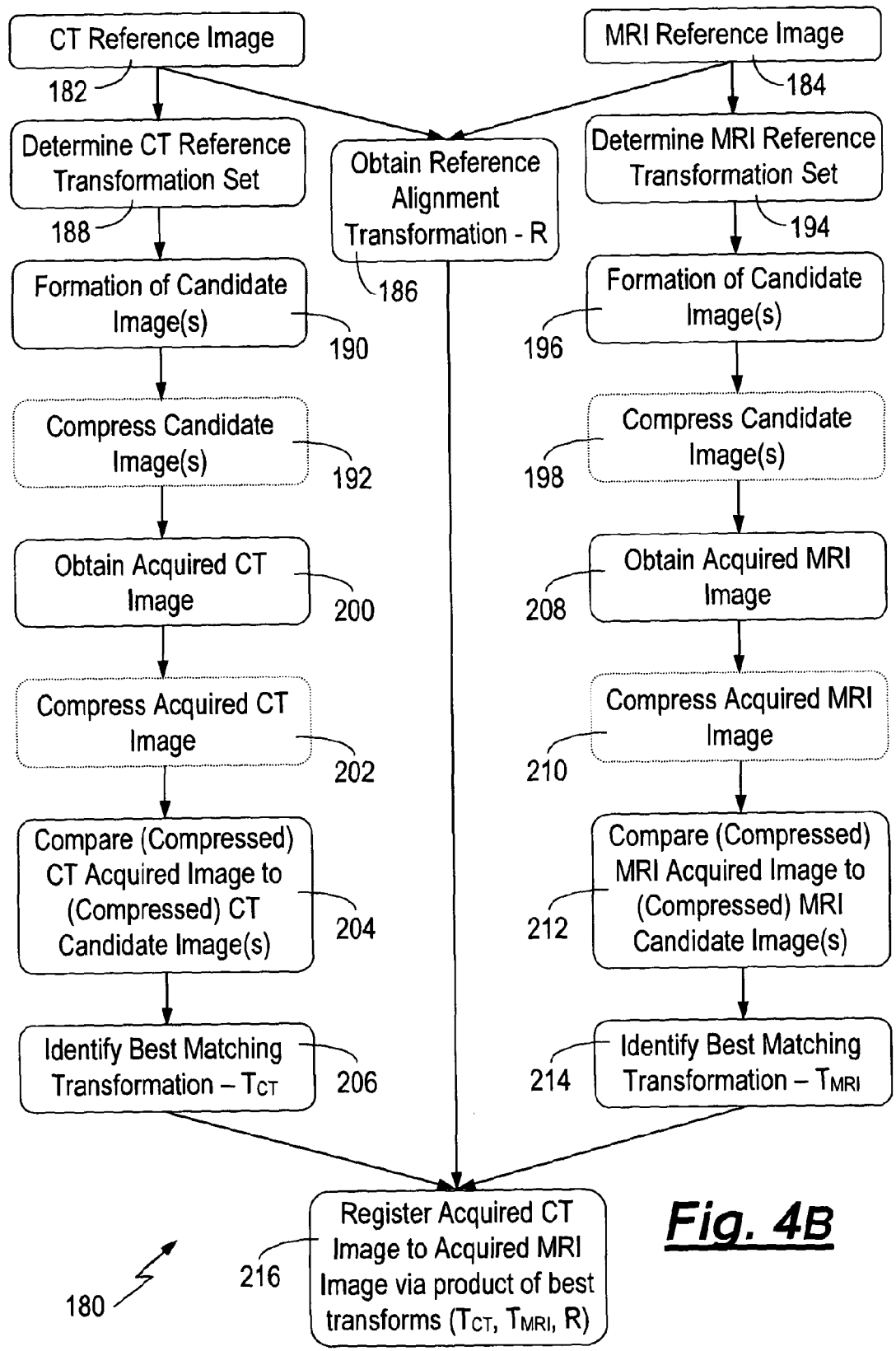
FIG. 4B is a flow chart representation of a process according to the second embodiment and represented in FIG. 2C.

According to another form of the process shown in FIG. 4B the variables of the CT transformation and/or MRI transformation are changed in a varying manner between applications of the transformations. Reference should be made to the description provided above with reference to FIG. 4A for further details of this approach.

Compression of candidate images and acquired images is mentioned above. As is described more fully in WO 2009/040514 the compression approach reduces the size of the image data sets to thereby reduce the computational burden when the comparisons are being carried out. In another approach and as described above, the compression of candidate images and acquired images is dispensed with and comparisons are carried out on the uncompressed images. Where this latter approach is followed the processing apparatus carrying out the comparison is configured to complete the comparisons in a period of time that is acceptable for the application in hand.

The compression method will now be described. The derivation of the compression method is described in detail in WO 2009/040514 as is the application of the compression method. In summary the image being compressed is partially differentiated with respect to each of the variables of the affine transformation to obtain a rate of change of the data set with respect to each variable. For example for the 'rotation about the x-axis' variable, a rotation of +1 degree is applied to the image being compressed to form a first intermediate data set and a rotation of −1 degree is applied to the image being compressed to form a second intermediate data set. Then the difference between the first and second intermediate data sets is determined and divided by the difference between the +1 degree and −1 degree rotations, i.e. 2 degrees. The same approach is applied for each of the eleven other variables of the affine transformation. The twelve rates of change that have been thus determined are $\mu_{,1}$ to $\mu_{,12}$. The twelve weighting vectors $b_1$ to $b_{12}$ are determined from:

$$b_1 = C^{-1}\mu_{,1}\sqrt{\mu_{,1}{'}C^{-1}\mu_{,1}}.$$

For the first weighting vector $b_1$ and from:

$$b_m = C^{-1}\mu_{,m} - \sum_{q=1}^{m-1}(\mu^t_{,m}b_q)b_q\sqrt{\mu^t_{,m}C^{-1}\mu_{,m} - \sum_{q=1}^{m-1}(\mu^t_{,m}b_q)^2}\ .$$

for the second and subsequent weighting vectors $b_m$; m= 1 ... M
where: C is a noise covariance matrix having a value of $1/\sigma^2$ for each element in the main diagonal so as to represent white noise of a predetermined amplitude; a data set undergoing compression comprises N elements of data, the N elements of data being represented by a vector $x_i$, i=1, ... N; the plurality of variables comprise M variables; and the plurality of weighting vectors consist of M vectors $b_m$, m=1, ... M. Each element of the compressed image is then determined by dot product multiplication of each weighting vector with the image undergoing compression.

The invention claimed is:

1. A process of bringing first and second data sets into registration or conformity with each other by electronic methods, each of the first and second data sets being a representation of a particular physical object, the process comprising:
    having a plurality of candidate data sets, each candidate data set being a differently shifted or distorted form of a reference data set, the reference data set being a representation of the physical object;
    comparing the first data set with each of the candidate data sets and in dependence on the comparisons determining a first transformation that brings into registration or conformity with each other the reference data set and a particular candidate data set out of the plurality of candidate data sets which provides a best match with the first data set;
    comparing the second data set with each of the candidate data sets and in dependence on the comparisons determining a second transformation that brings into registration or conformity with each other the reference data set and a particular candidate data set out of the plurality of candidate data sets which provides a best match with the second data set; and
    bringing the first and second data sets into registration or conformity with each other in dependence on the first and second transformations,
    wherein the plurality of candidate data sets are generated by applying a transformation to the reference data set, the transformation being changed from one application of the transformation to another application of the transformation such that each of a plurality of candidate data sets is a differently shifted or distorted reference data set, and
    wherein said applications of the transformation comprises a first main application of the transformation such that at least one predetermined variable of the transformation is changed in a substantially constant manner from one application of the transformation to another application of the transformation; and a second main application of the transformation such that the at least one predetermined variable is changed in a varying manner from one application of the transformation to another application of the transformation.

2. The process according to claim 1 in which the reference data set is a representation of the particular physical object.

3. The process according to claim 1 in which the reference data set is configured such that each of substantially all data sets representing different forms of the same type of physical object and to which type the particular physical object belongs can be registered with or brought into conformity with the reference data set.

4. The process according to claim 1 in which the reference data set is a representation of a second particular physical object with the first and second data sets being representations of a first particular physical object, the first and second particular physical objects being of a same kind of physical object.

5. The process according to claim 1 in which the candidate data sets are formed as part of a non time critical process and the step of bringing the first and second data sets into registration or conformity with each other is carried out during a time critical process.

6. The process according to claim 5 in which the steps of comparing the first and second data sets are carried out as part of a non time critical process.

7. The process according to claim 1 in which the first and second data sets are brought into registration or conformity with each other in dependence on one of the first and second transformations and an inverse of the other of the first and second transformations.

8. The process according to claim 1 in which a data set is a representation of a physical object in at least two dimensions.

9. The process according to claim 1 further comprising providing a registered or conforming data set in dependence on the step of bringing the first and second data sets into registration or conformity with each other.

10. The process according to claim 9 further comprising conveying the registered or conforming data set to at least one of: a Visual Display Unit (VDU); a film; and a Picture, Archiving and Communications (PACS) system.

11. The process according to claim 1, wherein the second main application is carried out after carrying out the first main application.

12. The process according to claim 1, wherein variation in a manner in which the at least one predetermined variable is changed from one application of the transformation to another application of the transformation is determined in accordance with a multi-parameter functional minimisation approach.

13. The process according to claim 1, wherein variation in a manner in which the at least one predetermined variable is changed from one application of the transformation to another application of the transformation may be determined in dependence on an outcome of comparison of at least one of the first data set and the second data set with the candidate data sets.

14. A process of bringing first and second data sets into registration or conformity with each other by electronic methods, each of the first and second data sets being a representation of a particular physical object, the process comprising:
    having a plurality of candidate data sets, each candidate data set being a differently shifted or distorted form of a reference data set, the reference data set being a representation of the physical object;
    comparing the first data set with each of the candidate data sets and in dependence on the comparisons determining a first transformation that brings into registration or conformity with each other the reference data set and a particular candidate data set out of the plurality of candidate data sets which provides a best match with the first data set;
    comparing the second data set with each of the candidate data sets and in dependence on the comparisons determining a second transformation that brings into registration or conformity with each other the reference data set and a particular candidate data set out of the plurality of candidate data sets which provides a best match with the second data set; and bringing the first and second data sets into registration or conformity with each other in dependence on the first and second transformations, wherein the process further comprising:

compressing each of the plurality of candidate data sets to form a respective compressed candidate data set and compressing each of the first and second data sets to form compressed first and second data sets, the compressing of a data set comprising: determining a plurality of weighting vectors in dependence on predetermined variables of a transformation used to obtain the candidate data sets, the number of weighting vectors being equal to the number of predetermined variables; multiplying all data in a data set by each weighting vector to provide data elements of a compressed data set, and in which weighting vectors are binary, the weighting vectors being operative as a mask to select at least one portion of the data.

15. The process according to claim 14 in which the step of determining a plurality of weighting vectors comprises determining a rate of change of a data set, which is undergoing compression, with respect to at least one of the predetermined variables.

16. A non-transitory computer storage that stores executable program instructions for causing a computer to perform the process according to claim 1.

17. A non-transitory computer storage according to claim 16, comprising at least one of: a memory record medium; a read only memory; and a computer memory.

18. A computer system comprising a non-transitory computer storage that stores executable program instructions for causing a computer to perform the process according to claim 1.

19. An electrical apparatus operative to bring a first data set and a second data set into registration or conformity with each other, each of the first and second data sets being a representation of a particular physical object, the electrical apparatus comprising a digital processor and a data store, the data store being operative to store: a plurality of candidate data sets, each candidate data set being a differently shifted or distorted form of a reference data set, the reference data set being a representation of the physical object; and the digital processor being operative: to compare the first data set with each of the candidate data sets and, in dependence on the comparisons, to determine a first transformation that brings into registration or conformity with each other the reference data set and a particular candidate data set out of the plurality of candidate data sets which provides a best match with the first data set; to compare the second data set with each of the candidate data sets and, in dependence on the comparisons, to determine a second transformation that brings into registration or conformity with each other the reference data set and a particular candidate data set out of the plurality of candidate data sets which provides a best match with the second data set; and to bring the first and second data sets into registration or conformity with each other in dependence on the first and second transformations, wherein the digital processor being further operative to: generate the plurality of candidate data sets by applying a transformation to the reference data set, the transformation being changed from one application of the transformation to another application of the transformation such that each of a plurality of candidate data sets is a differently shifted or distorted reference data set, and wherein the applications comprises a first main application of the transformation such that at least one predetermined variable of the transformation is changed in a substantially constant manner from one application of the transformation to another application of the transformation; and a second main application of the transformation such that the at least one predetermined variable is changed in a varying manner from one application of the transformation to another application of the transformation.

20. A non-transitory computer storage that stores executable program instructions for causing a computer to perform the process according to claim 14.

* * * * *